US009720764B2

(12) United States Patent
Billeci et al.

(10) Patent No.: US 9,720,764 B2
(45) Date of Patent: Aug. 1, 2017

(54) UNCORRECTABLE MEMORY ERRORS IN PIPELINED CPUS (71) Applicant: INTERNATIONAL BUSINESS MACHINES CORPORATION, Armonk, NY (US)

(72) Inventors: Michael Billeci, Poughkeepsie, NY (US); Uwe Brandt, Boeblingen (DE); Christian Jacobi, Poughkeepsie, NY (US); Martin Recktenwald, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 14/813,507

(22) Filed: Jul. 30, 2015

(65) Prior Publication Data
US 2016/0034336 A1 Feb. 4, 2016

(30) Foreign Application Priority Data
Aug. 4, 2014 (GB) .................................. 1413750.9

(51) Int. Cl.
*G06F 11/07* (2006.01)
*G06F 12/0802* (2016.01)
*G06F 11/10* (2006.01)

(52) U.S. Cl.
CPC ........ *G06F 11/0793* (2013.01); *G06F 11/073* (2013.01); *G06F 11/0727* (2013.01);
(Continued)

(58) Field of Classification Search
CPC .............. G06F 11/0793; G06F 11/073; G06F 11/1064; G06F 11/0727
See application file for complete search history.

(56) References Cited

U.S. PATENT DOCUMENTS 4,371,930 A 2/1983 Kim
6,680,675 B1 1/2004 Suzuki
(Continued)

OTHER PUBLICATIONS

Panagos, Thimios et al., "Actionable User Intentions for Real-Time Mobile Assistant Applications," ceur-ws.org/Vol-478/paper3.pdf, downloaded from internet Jul. 21, 2015 (no further date information available).
(Continued)

*Primary Examiner* — Yolanda L Wilson
(74) *Attorney, Agent, or Firm* — Steven Chiu, Esq.; Blanche E. Schiller, Esq.; Heslin Rothenberg Farley & Mesiti P.C.

(57) ABSTRACT

Uncorrectable memory errors in pipelined central processing units. A processor core may be connected to a memory system and it may include a processor cache. In response to determining an uncorrectable error in data stored in the memory system, the address of a memory location of the uncorrectable error is stored in an address buffer and a recovery procedure is performed for the processor core. When fetching data from a memory location and if it is determined that the address of this memory location is stored in the address buffer, the content of a cache line related to the address is moved into a quarantine buffer of the processor core. When detecting an error in the data of the moved cache line, a repair procedure for the data of this address is triggered.

20 Claims, 6 Drawing Sheets

(52) U.S. Cl.
CPC ...... *G06F 11/1064* (2013.01); *G06F 12/0802* (2013.01); *G06F 2212/1032* (2013.01)

(56) References Cited

U.S. PATENT DOCUMENTS

| | | |
|---|---|---|
| 7,409,429 B2 | 8/2008 | Kaufman et al. |
| 8,138,912 B2 | 3/2012 | Singh et al. |
| 2003/0037280 A1* | 2/2003 | Berg ..................... G06F 11/073 714/6.12 |
| 2011/0320863 A1 | 12/2011 | Amroladze et al. |
| 2012/0131382 A1* | 5/2012 | Higeta ................ G06F 11/0724 714/6.13 |
| 2012/0242482 A1 | 9/2012 | Elumalai et al. |
| 2012/0311584 A1 | 12/2012 | Gruber et al. |
| 2013/0117604 A1* | 5/2013 | Ha ........................ G06F 11/073 714/6.32 |
| 2013/0246868 A1* | 9/2013 | Takagi .................. G06F 11/073 714/719 |
| 2015/0234702 A1* | 8/2015 | Walton ................ G06F 11/0793 714/6.13 |

OTHER PUBLICATIONS

Search Report for GB1413750.9 dated Jan. 27, 2015, pp. 1-3.

\* cited by examiner

UNCORRECTABLE MEMORY ERRORS IN PIPELINED CPUS

PRIOR FOREIGN APPLICATION

This application claims priority from the United Kingdom patent application number 1413750.9, filed Aug. 4, 2014, which is hereby incorporated herein by reference in its entirety.

BACKGROUND

One or more aspects of the invention relate generally to uncorrectable memory errors in pipelined central processing units (CPUs).

Modern processors may operate using a plurality of processor cores working in conjunction with a memory system that is structured into different hierarchy levels. The closer a memory level to the processor core the faster the access of the processor core to the data in the memory. For example, access to an L1 (level 1) cache memory is much faster than a data access to an L3 or L4 cache. Additionally, the processors are constructed in a way to allow for a fast throughput of instructions and data through the processor. Pre-fetch logic and other sophisticated pipelining mechanisms may be used in conjunction with the memory system hierarchy for this purpose.

Therefore, it is a desire of a processor designer to avoid loading wrong or faulty data into the processor because repairing results of such faulty data is costly for the processor in the sense of overall computing power and throughput.

Thus, if an uncorrectable error is detected at a memory location of the main memory it may cause the processor to go through a recovery mechanism multiple times. This is a particular problem at the time when the memory location is hit by a pre-fetch operation in which case the problem is not reported to the operating system where it could be handled. Normally, memory errors in pre-fetch "branch wrong" paths are not reported and thus, not treated with an error recovery or repair procedure. This may imply the risk of entering a recovery loop.

A pre-fetch may, e.g., hit an address that may contain an uncorrectable error. Since it is a pre-fetch, it may or may not contain vital data for continued processing. The error may be reported as a core recovery error by the ECC (error correction code) logic. After recovery, the core may resume operation and may potentially pre-fetch the address of the error again. If this repeats several times, the core is eventually spared even though the logic of that core is without error.

There are several disclosures related to a method for memory errors in pipelined CPUs.

Document US 2008/0270821 A1, which is hereby incorporated herein by reference in its entirety, discloses a system and method of recovering from errors in a data processing system. The data processing system includes one or more processor cores coupled to one or more memory controllers. The one or more memory controllers include at least a first memory interface coupled to a first memory and at least a second memory interface coupled to a second memory. In response to determining an error has been detected in the first memory, access to the first memory via the first memory interface is inhibited.

Document WO 2014/051550 A1, which is hereby incorporated herein by reference in its entirety, discloses techniques for recovering from non-correctable memory errors. A memory location may be accessed. It may be determined that the memory location contains a non-correctable error. A range of addresses associated with the memory location may be determined. Corrective action may be taken on the entire range of addresses to identify other addresses within the range of addresses that contain non-correctable memory errors.

However, there may be a need for optimized handling of errors in storage cells occurring to memory cells of memory levels close to the processor core.

SUMMARY

This need may be addressed by a method for uncorrectable memory errors in pipelined CPUs, an error recovery system for an error recovery by a processor core, and a processor.

In one aspect, a method of performing error recovery by a processor core connected to a main memory system and including a processor cache is provided. The method includes, for instance, based on determining an uncorrectable error in data stored in the main memory system, storing an address of a memory location of the uncorrectable error in an address buffer and performing a recovery procedure for the data; based on fetching data from a selected memory location and determining that the address of the selected memory location is stored in the address buffer, moving content of a cache line related to the address into a quarantine buffer of the processor core; and based on detecting an error in the data of the moved cache line, triggering a repair procedure for data of the address.

BRIEF DESCRIPTION OF THE DRAWINGS

Embodiments of the invention will now be described, by way of example only, and with reference to the following drawings.

DETAILED DESCRIPTION

In the context of this description, the following conventions, terms and/or expressions may be used:

The term "processor core" may denote one of a plurality of central processing units in a processor. Such multi-core processors have become available after a performance limit for a single-core processor slowly reached saturation. Each processor core may independently read and execute program instructions.

The "term processor cache" may denote an intermediate memory for data close to a processor core or to a processor.

There may be several levels of cache memory. Processors may have a hierarchy of an L1 (level 1) cache, an L2 cache, an L3 cache, an L4 cache and a main memory. More or less memory levels may be present in a memory hierarchy of a memory system.

The term "uncorrectable error" may denote that an error occurring in a storage cell may not be directly correctable using an error correction code (ECC). Typically, based on a 72/64 bit architecture—meaning 64 usable bits with eight additional ECC bits —a bit error may be correctable and a double bit error may be detectable.

The term "address buffer" may denote a special storage location for storing an address of data in the memory system. The address buffer may be a special register in the processor.

The term "recovery procedure" may denote a procedure to ensure a defined status of the processor core. It has to be assured that the processor only works with correct and uncorrupted data. The recovery procedure may reset the processor core to a known status with correct data.

The term "cache line" may denote a consecutive series of entries in a cache memory of a processor core. A CPU or processor core cache may be an intermediate storage used by the processor core of a processor or computer to reduce the average time to access memory cells in lower levels (having higher cache level numbers) of a memory hierarchy. The cache is a smaller, faster memory which stores copies of the data from frequently used main memory locations or higher level cache locations.

The term "repair procedure" may here denote a special procedure to repair unrecoverable detected errors in data to be processed by a processor core.

One or more aspects of the method for uncorrectable memory errors in pipelined CPUs and the related error recovery system may offer a couple of advantages:

In order to keep the flow of data and addresses streaming through the processor at maximum speed for maximum performance experienced by a user, it may be avoided to feed wrong or erroneous data to the processor core. One or more aspects may detect such errors at an early stage and treat the cache line in which an unrecoverable or uncorrectable error in a data field may have been detected in a way to avoid unnecessary halts and recovery procedures of the processor core. If data at the address of the error in the memory system may be fetched, one or more aspects may provide provisions to treat the entire cache line in which the erroneous data may be stored. This way, cache line integrity may be guaranteed and the processor core may continue to operate without "infecting" other cache lines through reordering data between cache lines. Cache lines may be kept consistent even in the event of an unrecoverable error in a data field of a cache line.

Additional features may enhance the general concept of one or more aspects.

According to one embodiment, the memory system may comprise at least one out of the group comprising an L1 cache, an L2 cache, an L3 cache and an L4 cache and a main memory. Especially, high performance processors such as mainframe processors and their corresponding processor cores maintain a sophisticated cache level hierarchy. The detected error may occur at any level of the memory system comprising at least the above-mentioned levels.

According to a further embodiment, the address buffer may be a special register of the processor core. This may enable a fast reaction time in case of an error. And it may also be more practical than providing the address buffer outside the processor core.

According to one additional embodiment, the address buffer may be one of a set of address compare registers in the core processor. This way, a fast check may be performed of an address containing erroneous data—e.g., a data byte with a two bit error —if the processor core tries to fetch the data of the address again.

According to another embodiment, each address compare register may be 38 bits wide. In one implementation, in a 64-bit processor core, the relevant address range may go from bits 17 to 55 if the address bits are numbered from bit 0 to bit 63. If the physical address space from bits 0 to 17 may not be supported and if a cache line may be 256 bytes long, then bits 56 to 63 of the address may not be required to identify a cache line uniquely. Such a situation may be present with the IBM System z architecture.

According to one further embodiment, the repair procedure may force zeroes to all data bits of all cache entries in the cache line moved to the quarantine buffer. This means that the cache line is cleared and a repair procedure may take care of repairing the entire cache line in one go by a millicode procedure.

According to one embodiment of the method, a data bus address may be 8 bytes wide and a cache line may comprise 32 entries. This may be consistent to the above example of a 64-bit processor core and a 256 byte long cache line.

In one embodiment, repair procedures may execute a millicode procedure. This may be stored as part of the processor core. It may enable a fast recovery after a data error may have happened and been detected. No additional code for repairing the data error may be required.

One embodiment suggests that the execution of the millicode may comprise sending a trigger to the processor core indicating that a special treatment of the content of the address may be required. This way the processor may be aware of the fact that it may need to stop performing normal data processing and an error recovery procedure may be executed instead.

It should also be noted that embodiments of the invention may have been described with reference to different subject-matters. In particular, some embodiments may have been described with reference to method type claims whereas other embodiments may have been described with reference to apparatus type claims. However, a person skilled in the art will gather from the above and the following description that, unless otherwise notified, in addition to any combination of features belonging to one type of subject-matter, also any combination between features relating to different subject-matters, e.g., between features of the method type claims, and features of the apparatus type claims, is considered as to be disclosed within this document.

The aspects defined herein and further aspects of the present invention are apparent from the examples of embodiments to be described hereinafter and are explained with reference to the examples of embodiments, but to which the aspects of the invention are not limited.

In the following, a detailed description of the figures will be given. All instructions in the figures are schematic. Firstly, a block diagram of an embodiment of one or more aspects for performing error recovery is given. Afterwards, further details and embodiments of aspects of the error recovery system for an error recovery by a processor core will be described.

Figure 1:
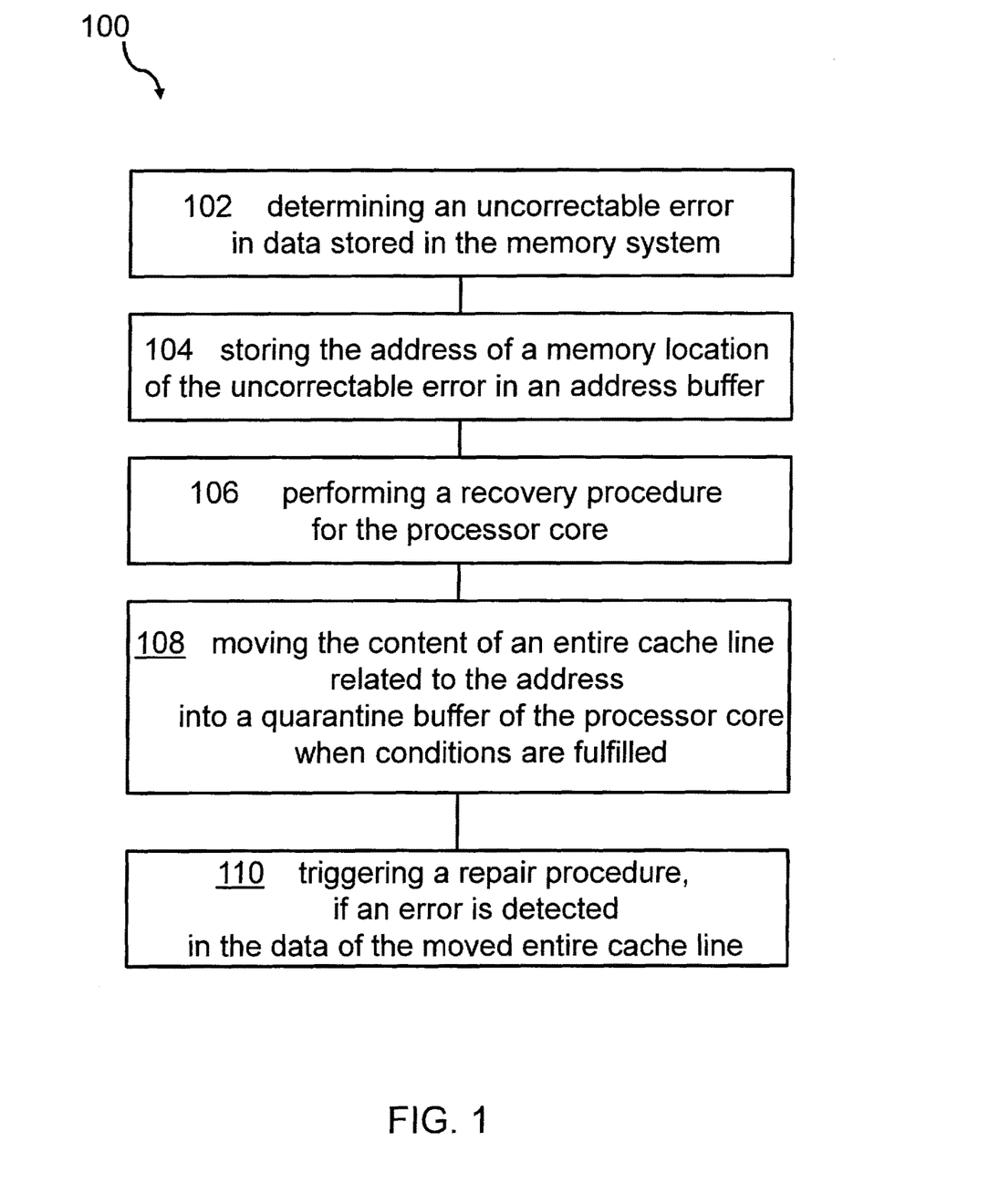
FIG. 1 shows a block diagram of an embodiment of the method for performing an error recovery, in accordance with an aspect of the present invention.

FIG. 1 shows one example of a block diagram of an embodiment of a method 100 for performing error recovery by a processor core connected to a main memory system. The main memory system may comprise a memory hierarchy, e.g., a level 1 cache (L1), an L2 cache, an L3 cache, an L4 cache and a main memory. The processor core may also comprise a processor cache which may be implemented as part of the memory hierarchy. The method may comprise in response to determining, 102, an uncorrectable error in data stored in the memory system, storing, 104, the address of a memory location of the uncorrectable error in an address buffer. This may be a special register as part of the processor core. In response to determining an uncorrectable error in data stored in the memory system, the method may also comprise performing, 106, a recovery procedure for the processor core, in particular, a reset of the status of the processor core to a known status comprising correct data.

Also part of the method is a moving step 108 in which the content of an entire cache line which is related to the address comprising the uncorrectable error is moved into a quarantine buffer of the processor core. This happens during fetching of data from a memory location, and if it is determined that the address of this memory location is stored in the address buffer.

If an unrecoverable error is then detected in the data of the moved entire cache line—which may now be in the quarantine buffer—a repair procedure for the data of this address is triggered 110.

Figure 2:
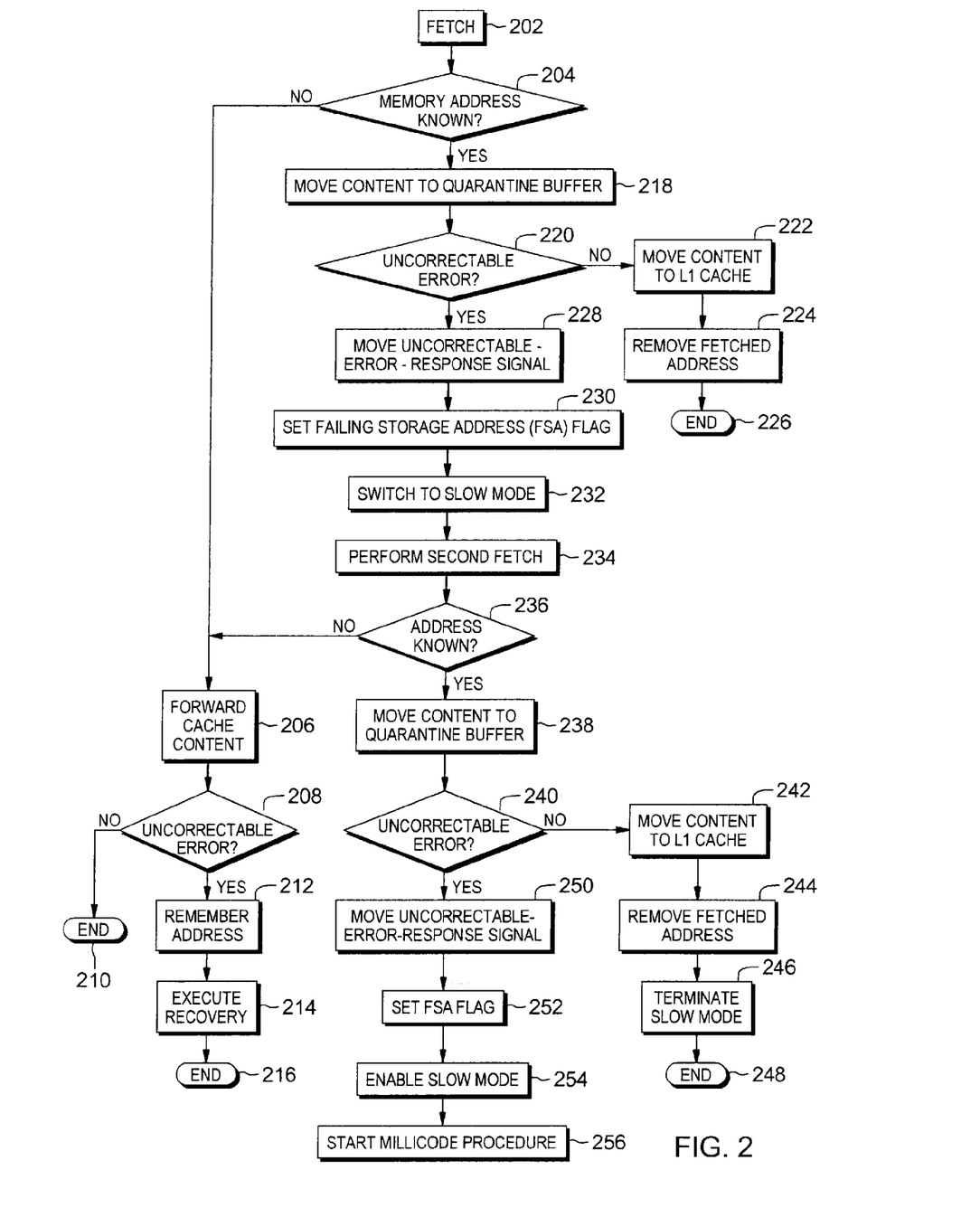
FIG. 2 shows in a more technical flow diagram an embodiment of the method of FIG. 1, in accordance with an aspect of the present invention.

FIG. 2 shows one example of aspects of the method from a more technical perspective 200 than the fundamental perspective according to FIG. 1.

The block diagram starts with a fetch instruction, 202. It is then determined, 204, if the memory address is known from recent fetches. In case of "No", the flow continues with a forwarding, 206, of the L3 cache content related to the address to the L1 cache. Next, it is determined, 208, if there is an uncorrectable error. In case of "No", the procedure ends, 210, as in every normal fetch instruction.

If an uncorrectable error may be determined in step 208—in case of "Yes"—the address will be remembered, step 212—meaning it may be stored in the special register of the processor core—a recovery procedure will be executed, 214, for the processor core and the procedure will end at 216. Otherwise—in case of "No" at step 208—the procedure may end at step 210.

In case in the determination step 204 it may be determined that the address is known—in case of "Yes"—the related content of the L3 cache will be moved, 218, to the quarantine buffer. In a four level cache hierarchy, also the related content of the L4 cache or the main memory may be moved to the quarantine buffer.

Next, it may be determined, 220, if there is an uncorrectable error in the content moved to the quarantine buffer. In case of "No", the quarantine buffer content may be moved to the L1 cache, step 222. Then, the fetched address in the address buffer may be removed, 224, from the address of uncorrectable errors and the procedure may end at step 226.

In case in the determination step 220 it may be determined that an uncorrectable error is present, an 'uncorrectable-error-response' signal is moved to the L1 cache at step 228, a failing storage address flag (FSA) may be set at step 230, the processor core may be switched to SLOW mode at step 232 and a second fetch may be performed at step 234. SLOW mode means here that the processor core will work in a non-pipelined mode without speculative fetches; one instruction after the other may be executed by the processor core. It may also be noted that the 'uncorrectable-error-response' signal belongs to a group of signals that may be generated if a processor core receives a cache line. A signal of such group may have the meaning "here is the cache line, it is ready to be read" or "here is the cache line for exclusive usage". In case of an uncorrectable error, the signals may be interpreted as "the requested data are not available, they have an uncorrectable error".

After the second fetch 234, it may be determined, if the address is known, step 236: In case of "No", the procedure may branch to step 206 and move the related L3 cache content to the L1 cache. The procedure may then continue with step 208 in the way described above for the unknown address.

If instead the address is determined to be known in determination step 236, the related content of the L3 cache may be moved to the quarantine buffer, step 238. Afterwards, a determination may be made, whether there is an uncorrectable error, step 240. In case of "No", the quarantine buffer content may be moved to the L1 cache, step 242, the fetched address may be removed from the address buffer in step 244, SLOW mode may be terminated, step 246, and the procedure may end at step 248.

In case the determination in step 240 may result in a "Yes", the 'uncorrectable-error-response' signal (see above) is moved to the L1 cache in step 250, the FSA flag is set, step 252, SLOW mode is enabled, step 254, and a millicode procedure may be started in step 256 to take appropriate action, e.g., start a repair procedure for the faulty data.

Figure 3:
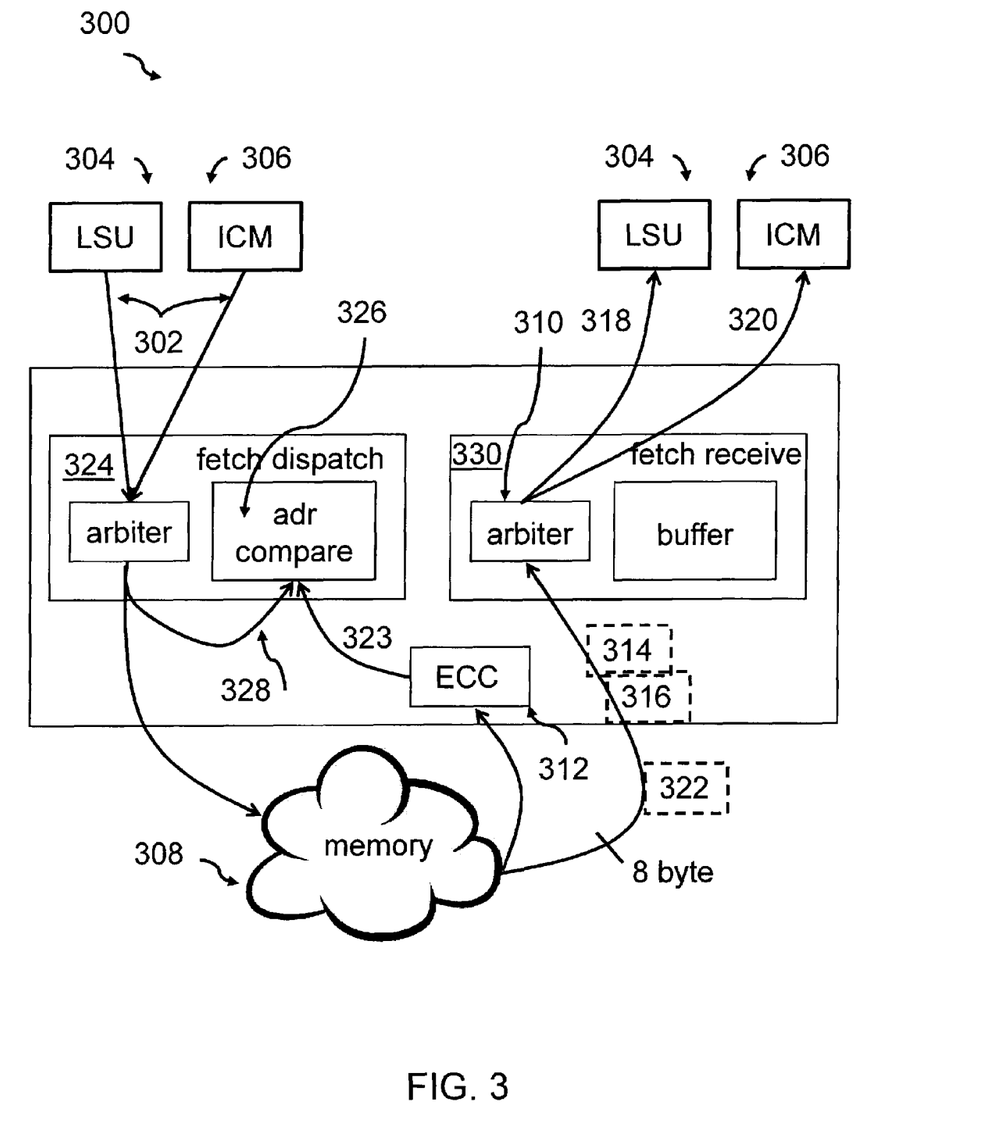
FIG. 3 shows a block diagram of a first phase of an embodiment of the method, in accordance with an aspect of the present invention.

FIG. 3 shows a block diagram 300 of a first phase of an embodiment of aspects of the method. When a fetch 302 is received from a core unit—e.g., using a load store unit (LSU) 304 and/or an instruction cache manager (ICM) 306—it gets dispatched to the memory system 308. The memory system 308 returns a cache line. In this particular implementation, a cache line may be 256 bytes long and the data bus may be 8 bytes wide. Thus, a cache line is returned in 32 data shots. The data goes to an arbiter 310 that forwards, 318, 320, the data to the core units 304, 306. In parallel, the ECC 312 is checked. In the example above, the first two data shots 314 and 316 may contain no errors and are delivered 318 and 320 to the core units 304, 306. The third data shot 322 may contain an error. The fetch dispatch logic 324 is informed, 323, about this error and adds, step 328, the address of the associated fetch to its address compare registers 326. The data is also delivered, 318, 320, to core unit 304, 306 using the fetch/receive logic 330 along with an error indication resulting in a recovery procedure.

Figure 4:
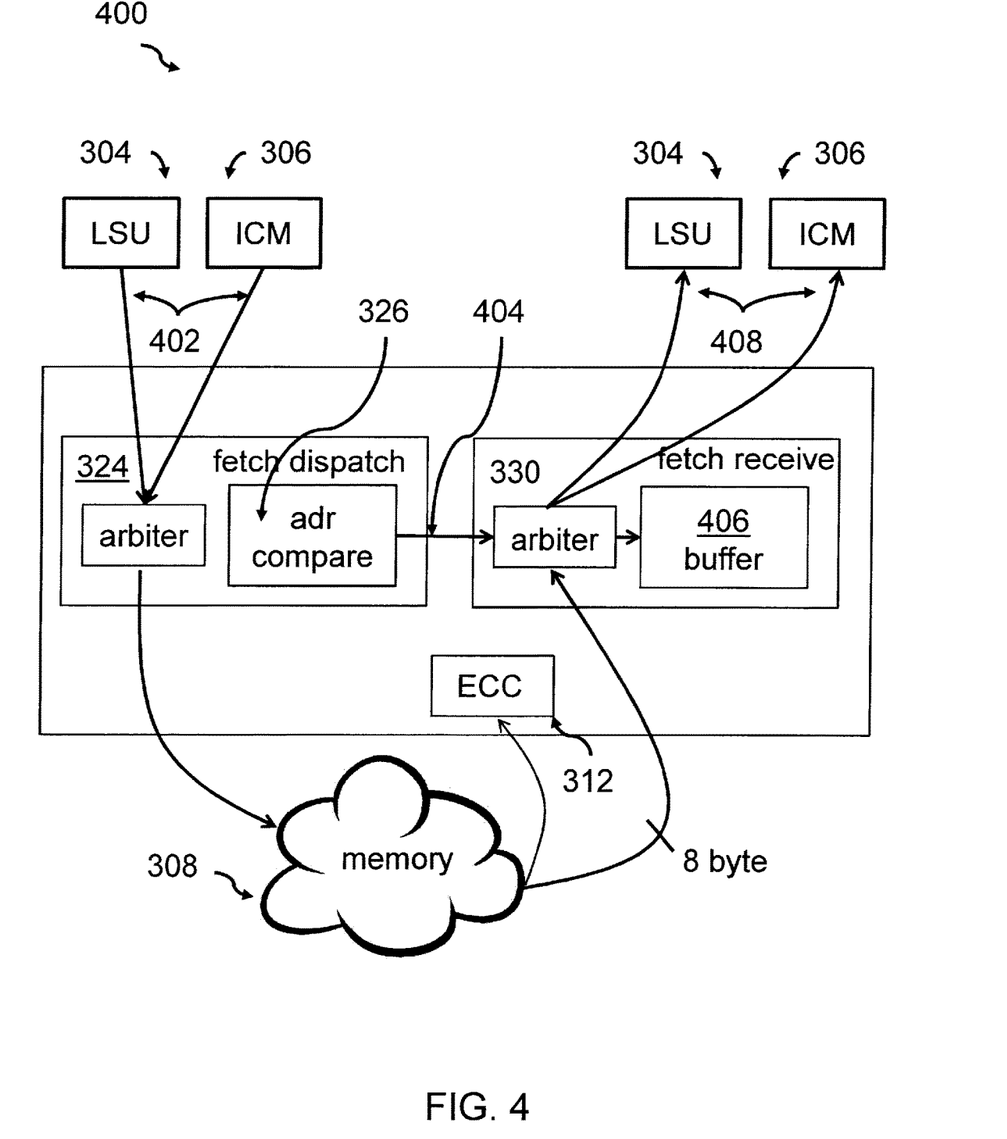
FIG. 4 shows a block diagram of a later phase of an embodiment of the method, in accordance with an aspect of the present invention.

FIG. 4 shows a block diagram 400 of a later phase of an embodiment of aspects of method 100. When the address is fetched a second time, 402, it will be sent to the memory subsystem 308, as before. In addition, it will hit the address in the address compare registers 326. The fetch receive logic 330 is notified, 404, that an uncorrectable error can be expected.

The memory subsystem 308 returns the data in 32 data shots, each 8 bytes wide, resulting in 256 bytes in total. This time, none of the data shots are forwarded to the core unit 304, 306. Instead they are placed into a quarantine buffer 406. In this example, the third data shot may still contain the error. Related processor core logic may place the address of the error into a millicode facility (not pictured) and may send, 408, a special response to the core. This response may trigger a millicode routine which reads the millicode facility to obtain the address of the error. It can now take appropriate action like writing all-zeros to that address.

Figure 5:
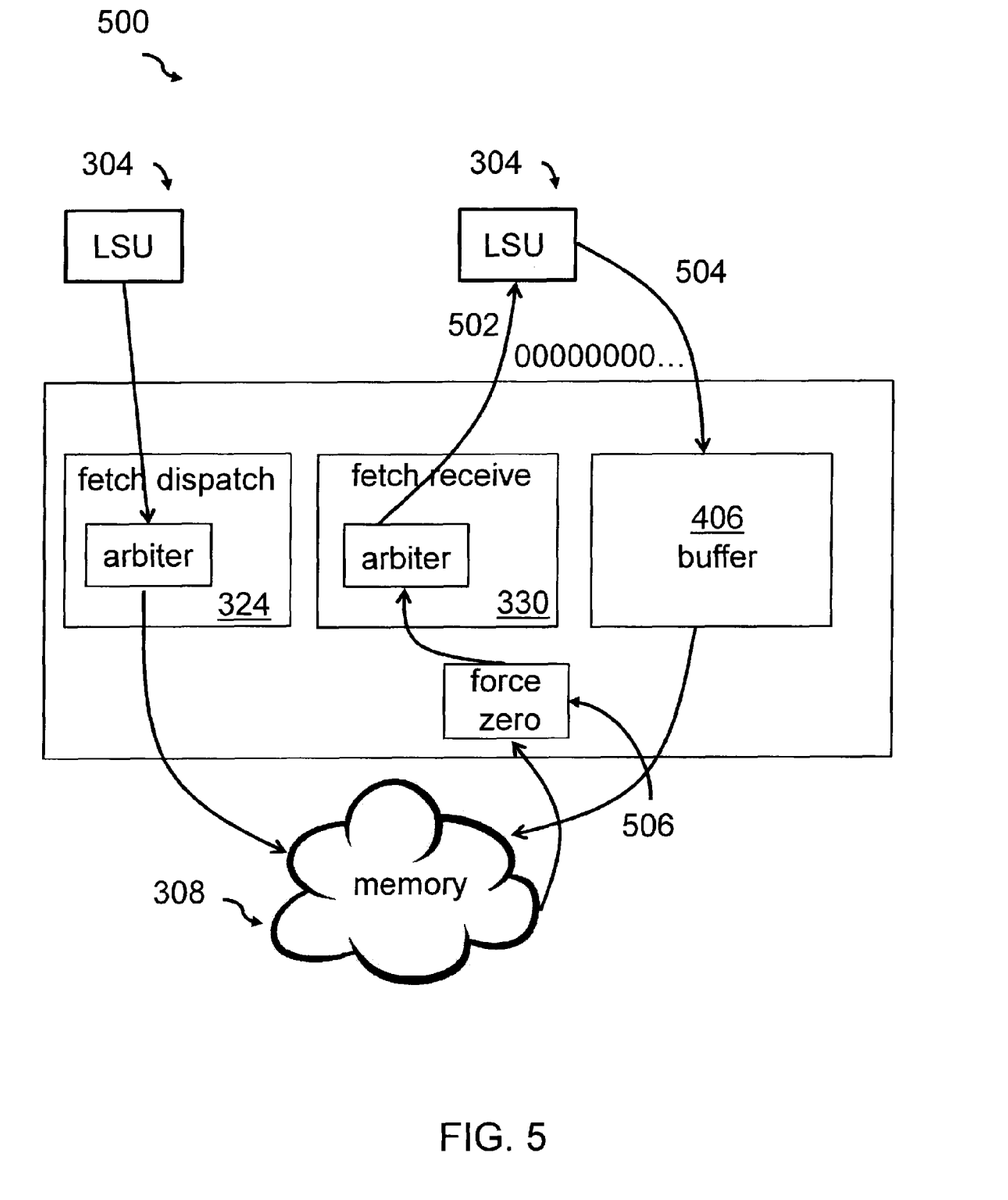
FIG. 5 shows a block diagram of an even later phase of an embodiment of the method, in accordance with an aspect of the present invention.

FIG. 5 shows a block diagram 500 of an even later phase of an embodiment of aspects of the method 100. When the millicode takes control, it can activate a cache-line-clearing mode in which all data from the memory subsystem 308 is forced, 506, to all zeros before it enters, 502, the core 304, represented by LSU 304 only. This prevents any accidental error check triggers. The millicode will then fetch (to get exclusive access) and store from and to this address while in cache-line clearing mode effectively writing, 504, fresh data (zeros) to the quarantine buffer 406 so that it no longer contains errors (presuming that the memory error was of a transient nature).

Figure 6:
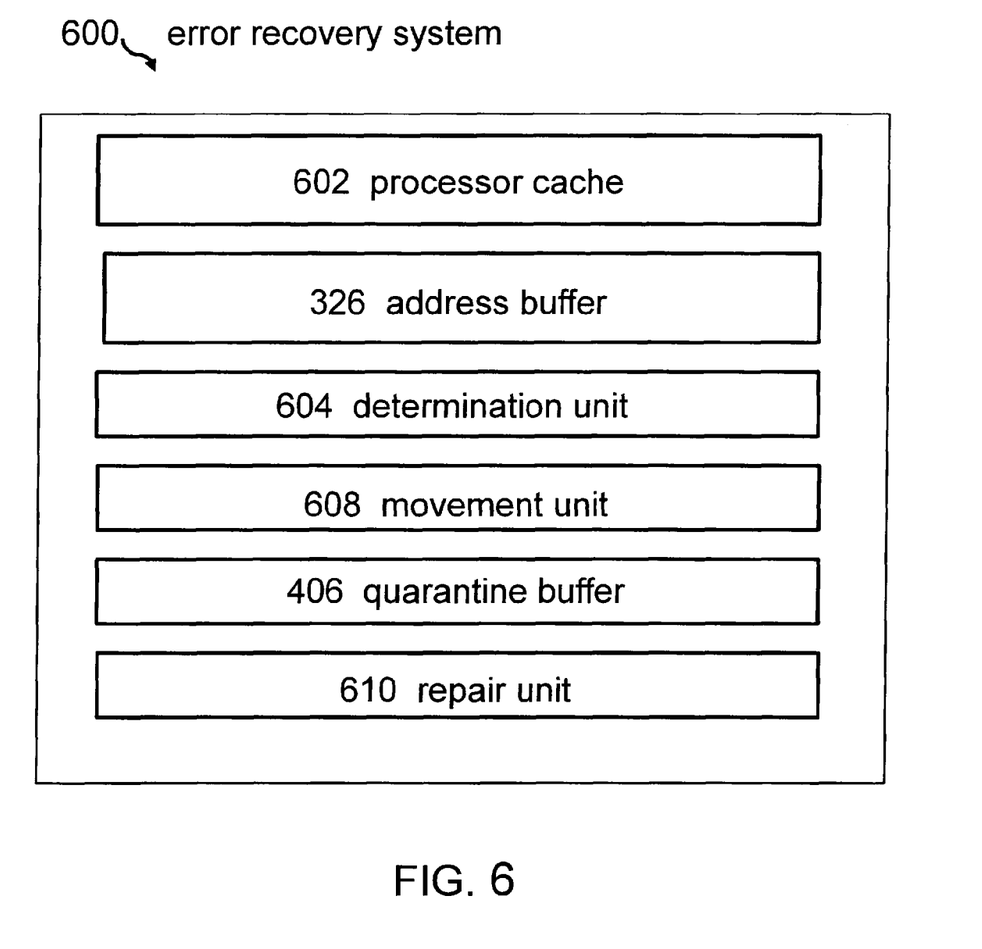
FIG. 6 shows a block diagram of a more abstract illustration of the error recovery system, in accordance with an aspect of the present invention.

FIG. 6 shows one example of a block diagram of an error recovery system 600. The error recovery system 600 is for error recovery by a processor core connected to a main memory system 308. The processor core may comprise a processor cache. The error recovery system 600 comprises a processor cache 602, an address buffer 326 in which the address of a memory location of a determined uncorrectable error is storable. The uncorrectable error may originate from a storage location in the main memory system 308. A determination unit (604) may be provided which is adapted for determining whether the address of this memory location is stored in the address buffer 326. A movement unit 608 may be adapted to move the contents of an entire cache line related to the address into a quarantine buffer 406 of the processor core if the address of this memory location is stored in the address buffer 326. A repair unit 610 may be adapted for repairing the data of this address when fetching data from a memory location and if an error is detected in the data of the moved entire cache line.

As described herein, according to one aspect, a method for performing an error recovery by a processor core connected to a main memory system may be provided. The processor core may comprise a processor cache. The method may comprise: in response to determining an uncorrectable error in data stored in the memory system, storing the address of a memory location of the uncorrectable error in an address buffer and performing a recovery procedure for the processor core. When fetching data from a memory location and if it is determined that the address of this memory location is stored in the address buffer, moving the content of an entire cache line related to the address into a quarantine buffer of the processor core. When detecting an error in the data of the moved entire cache line, triggering a repair procedure for the data of this address.

According to another aspect, an error recovery system for an error recovery by a processor core may be provided. A processor core may be connected to a main memory system. The processor core may comprise a processor cache. The error recovery system may comprise a processor cache, and an address buffer in which the address of a memory location of a determined uncorrectable error is storable, wherein the uncorrectable error originates from a storage location in the main memory system.

The error recovery system may also comprise a determination unit adapted for determining whether the address of this memory location is stored in the address buffer, and a movement unit adapted to moving the content of an entire cache line related to the address into a quarantine buffer of the processor core if the address of this memory location is stored in the address buffer. A recovery unit may trigger a recovery procedure for the processor core. A repair unit may be adapted for repairing the data of this address when fetching data from a memory location and if an error is detected in the data of the moved entire cache line.

According to another aspect, a processor may be provided that may comprise a plurality of processor cores, each of which comprising the error recovery system.

It may be noted that the recovery procedure is targeted at the consistency of the processor core status. The processor core may have started working on corrupted data. It may be required to stop all computations and go back to a known status and restart operation with the correct data.

While aspects of the invention have been described with respect to a limited number of embodiments, those skilled in the art, having benefit of this disclosure, will appreciate that other embodiments may be devised, which do not depart from the scope of the invention, as disclosed herein. Accordingly, the scope of aspects of the invention should be limited only by the attached claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor core of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The same may apply to millicode which may be executed by special functions as part of the processor.

These computer program instructions may also be stored in a computer readable medium that may direct the processor, other programmable data processing apparatus, or other devices to function in a particular manner, such that the instructions stored in the computer readable medium produce an article of manufacture including instructions, which implement the function/act specified in the flowchart and/or block diagram block or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of aspects of the invention and the practical application, and to enable others of ordinary skills in the art to understand the invention for various embodiments with various modifications, as are suited to the particular use contemplated.

What is claimed is:

1. A method of performing error recovery by a processor core connected to a main memory system and comprising a processor cache, the method comprising:
    based on determining an uncorrectable error in data stored in the main memory system, storing an address of a memory location of the uncorrectable error in an address buffer and performing a recovery procedure for the data;
    based on fetching data from a selected memory location and determining that the address of the selected memory location is stored in the address buffer, moving content of a cache line related to the address into a quarantine buffer of the processor core; and
    based on detecting an error in the data of the moved cache line, triggering a repair procedure for data of the address.

2. The method according to claim 1, wherein the main memory system comprises at least one of an L1 cache, an L2 cache, an L3 cache, and an L4 cache, and a main memory.

3. The method according to claim 1, wherein the address buffer is a special register of the processor core.

4. The method according to claim 1, wherein the address buffer is one of a set of address compare registers in the processor core.

5. The method according to claim 4, wherein an address compare register of the set of address compare registers is 38 bits wide.

6. The method according to claim 1, wherein the repair procedure forces zeroes to data bits of cache entries in the cache line moved to the quarantine buffer.

7. The method according to claim 1, wherein a data bus address is 8 bytes wide and the entire cache line comprises 32 entries.

8. The method according to claim 1, wherein the repair procedure is executing a millicode procedure.

9. The method according to claim 8, wherein the execution of the millicode procedure comprises sending a trigger to the processor core indicating a special treatment of the content of the address is required.

10. A computer program product for performing error recovery by a processor core connected to a main memory system and comprising a processor cache, the computer program product comprising:
    a non-transitory computer readable storage medium readable by a processing circuit and storing instructions for execution by the processing circuit for performing a method comprising:
        based on determining an uncorrectable error in data stored in the main memory system, storing an address of a memory location of the uncorrectable error in an address buffer and performing a recovery procedure for the data;

based on fetching data from a selected memory location and determining that the address of the selected memory location is stored in the address buffer, moving content of a cache line related to the address into a quarantine buffer of the processor core; and based on detecting an error in the data of the moved cache line, triggering a repair procedure for data of the address.

11. The computer program product according to claim 10, wherein the address buffer is a special register of the processor core.

12. The computer program product according to claim 10, wherein the address buffer is one of a set of address compare registers in the processor core.

13. The computer program product according to claim 10, wherein the repair procedure forces zeroes to data bits of cache entries in the cache line moved to the quarantine buffer.

14. The computer program product according to claim 10, wherein the repair procedure is executing a millicode procedure.

15. The computer program product according to claim 14, wherein the execution of the millicode procedure comprises sending a trigger to the processor core indicating a special treatment of the content of the address is required.

16. A computer system for performing error recovery by a processor core connected to a main memory system and comprising a processor cache, the computer system comprising:

a memory; and a processor in communications with the memory, wherein the computer system is configured to perform a method, said method comprising:

based on determining an uncorrectable error in data stored in the main memory system, storing an address of a memory location of the uncorrectable error in an address buffer and performing a recovery procedure for the data;

based on fetching data from a selected memory location and determining that the address of the selected memory location is stored in the address buffer, moving content of a cache line related to the address into a quarantine buffer of the processor core; and based on detecting an error in the data of the moved cache line, triggering a repair procedure for data of the address.

17. The computer system according to claim 16, wherein the address buffer is a special register of the processor core.

18. The computer system according to claim 16, wherein the address buffer is one of a set of address compare registers in the processor core.

19. The computer system according to claim 16, wherein the repair procedure forces zeroes to data bits of cache entries in the cache line moved to the quarantine buffer.

20. The computer system according to claim 16, wherein the repair procedure is executing a millicode procedure.

* * * * *